Sept. 15, 1970  E. C. MONTGOMERY  3,528,794
GAS IMPERVIOUS MEMBRANE SEAL FOR FLOAT GLASS PLENUM CHAMBERS
Filed Oct. 30, 1967  2 Sheets-Sheet 1
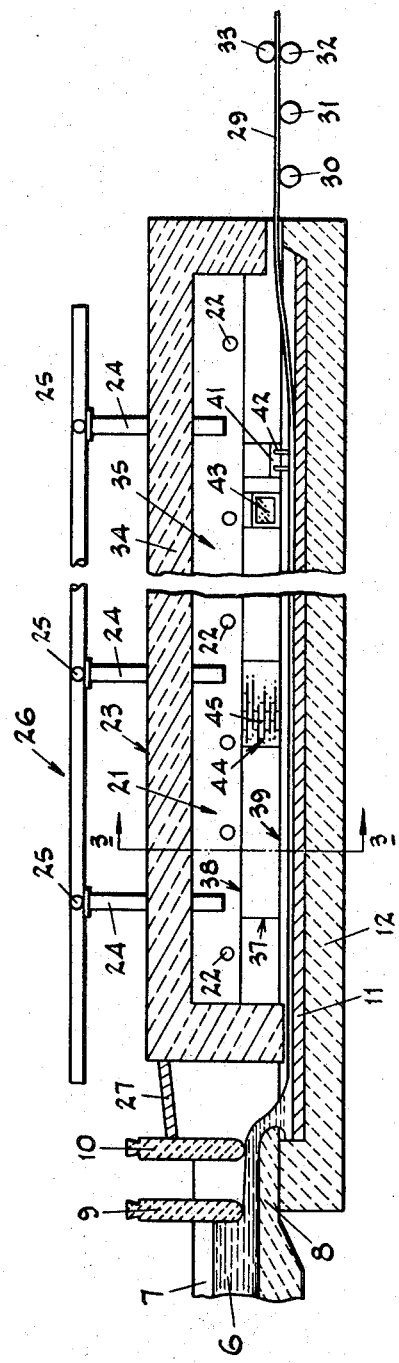
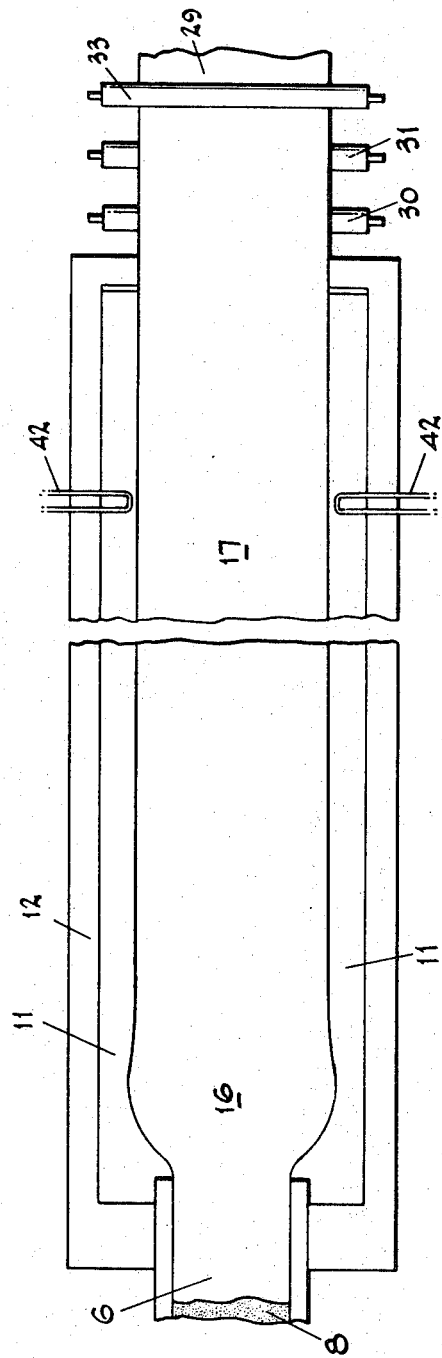
INVENTOR.
Edwin C. Montgomery
BY
Collins & Oberlin
ATTORNEYS Sept. 15, 1970     E. C. MONTGOMERY     3,528,794
GAS IMPERVIOUS MEMBRANE SEAL FOR FLOAT GLASS PLENUM CHAMBERS
Filed Oct. 30, 1967     2 Sheets-Sheet 2

INVENTOR.
Edwin C. Montgomery
BY Collins & Oberlin
ATTORNEYS

United States Patent Office 3,528,794
Patented Sept. 15, 1970

1

3,528,794
GAS IMPERVIOUS MEMBRANE SEAL FOR FLOAT GLASS PLENUM CHAMBERS
Eldwin C. Montgomery, Modesto, Calif., assignor to Libbey-Owens-Ford Glass Company, Toledo, Ohio, a corporation of Ohio
Filed Oct. 30, 1967, Ser. No. 678,966
Int. Cl. C03b 18/02
U.S. Cl. 65—168                                   4 Claims

ABSTRACT OF THE DISCLOSURE

A side wall, having closure members creating a space adjacent a flange extending outwardly from the wall, forms part of a plenum chamber for confining the float atmosphere above the metal bath in a float glass forming apparatus. Structure for preventing leakage of air into the float atmosphere involves the use of a substantially gas impervious heat resisting membrane such as metal foil wrapped around the flange and covering the opening.

BACKGROUND OF THE INVENTION

Field of the invention

The present invention relates broadly to the manufacture of float glass and more particularly to a method and apparatus for improving the function of the plenum chamber, and especially of the side seal between the roof of the chamber and the tank or the molten metal bath, in float glass forming apparatus.

Description of the prior art

While the production of float glass, as commercial product, is relatively new it is already being manufactured by some of the major glass companies, and a conventional form of float forming apparatus is illustrated and described in U.S. Pat. No. 3,083,551, granted Apr. 2, 1963. As there explained, the manufacture of flat glass by the float process involves delivering glass at a controlled rate onto a bath of molten metal (usually tin) and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the bouyant body in ribbon form will be continuously advanced along the bath and sufficiently cooled as it advances to permit it to be taken unharmed from the bath by mechanical conveying means.

Above the float bath of molten metal an enclosed head space or plenum chamber is provided to contain the so-called float atmosphere, usually of a non-oxidizing gas or mixture of gases, and which must be closely confined and maintained under sufficient pressure to inhibit contamination by leakage of air into the head space.

However, successful operation of the float process requires careful and continuous supervision and, for this reason, viewing openings must be provided in the side walls of the plenum chamber so that operating personnel can look into the head space at various points all along the length of the machine and inspect the float bath and glass ribbon at frequent intervals. Also, it is necessary to introduce operating equipment, such as coolers, fences for the ribbons and other devices, into the plenum chamber on a temporary or a more or less permanent basis in carrying out the float process. For this reason, and to provide access to the interior of the plenum chamber at any point along its length, the side sealing wall, or so-called "side seal" of the chamber, which extends vertically

2 between the roof and the top of the tank for the molten glass, is preferably made up of a plurality of individual blocks which can be removed when desired.

As a result, there exist joints between these blocks, between the sealing side walls and the roof of the chamber, between the side walls and the tank, and between side wall blocks and the float operating or inspecting equipment, all of which create potential spaces or openings through which air can leak into the plenum chamber and contaminate the float atmosphere. Various types of high temperature mortars and cements as well as other calking materials are conventioinally used to seal these joints but, since the sealing material must be such that it is no only substantially air impermeable but also will permit individual blocks to be removed without injury from the wall, the problem of air leakage through and around the sealing side walls in float glass plenum chambers has been a continuing and very troublesome one.

SUMMARY

According to the present invention this problem is overcome, and then insertion of required operating and inspection apparatus into the plenum chamber facilitated, by the provision of an improved form of float plenum chamber including sealing side walls formed of individual blocks and in which joints and spaces or openings in and between the individual blocks and associated members are effectively sealed by covering them with substantially impervious membranes.

It is therefore a primary object of the invention to effectively maintain the float atmosphere and to substantially reduce, if not to entirely eliminate, the infiltration of air into float glass plenum chambers.

Another object is to provide an effective but readily removable and replaceable seal for this purpose.

Still another object is the provision of a relatively simple procedure for sealing joints, spaces and openings in and around the float plenum chamber which involves, primarily, applying strips or sections of metal foil or the like on and in covering relationship to such joints, spaces and openings.

Further objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout the same:

FIG. 1 is a longitudinal sectional view through a float glass forming apparatus provided with the improved plenum chamber of the invention;

FIG. 2 is a plan view of the apparatus shown in FIG. 1 with portions of the plenum chamber removed;

DESCRIPTION OF THE PREFERRED EMBODIMENTS

Figure 4:
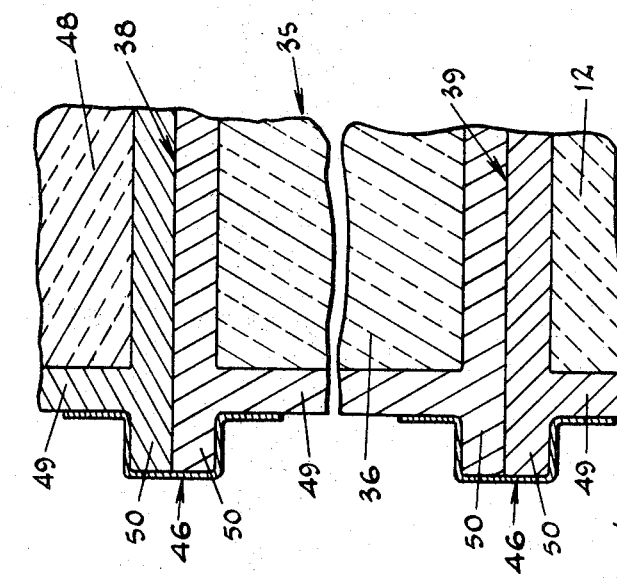
FIG. 4 is a fragmentary view similar to FIG. 3, of a modified joint structure.

Referring now more particularly to the drawings, there is illustrated in FIGS. 1 and 2 a typical float glass machine similar to the one disclosed in U.S. Pat. 3,083,551. In this apparatus molten glass 6 is supplied from a forehearth 7 to a spout lip 8 in an amount regulated and controlled by a tweel 9 and a gate 10.

The glass, flowing from the spout 8 on to the relatively wide metal bath 11 contained in a tank 12, forms a buoyant molten body indicated at 16 and a buoyant layer of stable thickness 17 develops therefrom.

The metal bath 11, in the tank, and the headspace 21 over the bath, are heated by radiant heat directed downwardly from heaters 22 and this headspace 21, which contains the "float atmosphere," is enclosed by a plenum chamber 23 which, with extension 27, makes it possible to maintain a sufficient volume of protecting gas over that part of the metal bath 11 that is exposed at each side of the glass in the float chamber. The roof of the chamber 23 is provided at intervals with ducting 24 connected by branches 25 to headers 26 through which the protecting gas is fed into the headspace 21 at a rate to create a plenum therein.

When the ultimate ribbon 29 is to be of substantially the same thickness as the equilibrium or stable thickness of the glass the temperature of the glass in the buoyant layer or ribbon 17 is so controlled as to progressively cool it from the tweel 19 to the discharge end of the apparatus by which time the ribbon should reach a temperature at which it is sufficiently stiffened to allow its transfer to a lehr on mechanical conveying means without detriment to the glass surfaces.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet and sufficient to advance it along the bath.

As best shown in FIGS. 1 and 3 to 5, the plenum chamber 23 comprises a substantially integral roof portion 34 and a side sealing wall 35, extending between the roof and the side wall of the tank 12, and made up of a plurality of individual blocks 36. With this arrangement, points 37 exist between individual blocks, joints 38 between the side sealing wall 35 and the roof 34 and joints 39 between the wall 35 and tank 12. Similar joints 40 exist between mounting or closure members 41, for operating and viewing equipment such as water cooled fences 42 and windows 43, and the adjacent side wall blocks; and, where operating equipment has been temporarily removed, a relatively large opening such as shown at 44 may remain. Such openings are generally bricked up as shown at 45 and the aforementioned joints are usually cemented or puttied but all such joints and openings offer potential passageways or spaces for leakage of contaminating outside air into the plenum chamber and dissipation of the protecting atmosphere outwardly therefrom.

The gas in the protecting float atmosphere in the headspace 21 must be one which will not chemically react with the metal of the float bath 11 to produce contaminants of the glass (for example, a mixture of nitrogen and hydrogen is commonly used where the metal in the bath is tin) and maintained under sufficient pressure to create a plenum within the chamber 23.

As indicated above, loss and/or contamination of the gas constituting the float atmosphere creates serious problems and the methods and materials heretofore used to seal the above-mentioned joints and openings in the side sealing wall of the plenum chamber have been operationally inadequate to produce a finished float glass product of the desired quality.

According to this invention, however, it has been found that all such joints and openings can be adequately sealed in a rapid and expeditious manner by a relatively simple procedure involving the application of a substantially impervious membrane. In the embodiment illustrated in the drawings, commercially available strips or sheets of aluminum or other metal foil are employed to cover the joints and openings and these have produced remarkably good results in actual practice.

Figure 3:
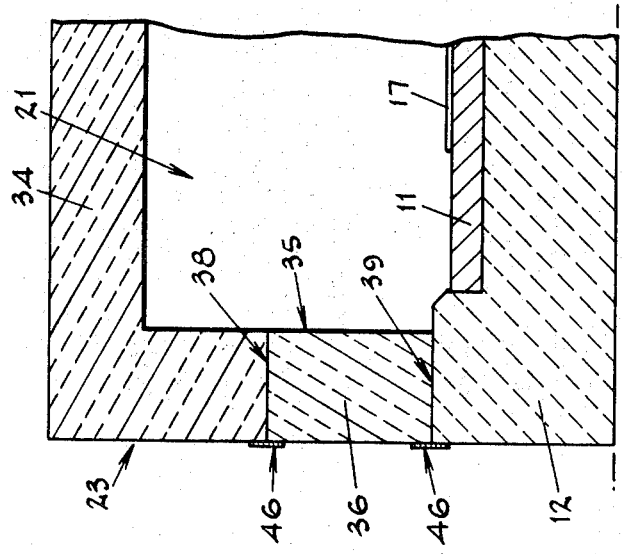
FIG. 3 is a transverse, sectional view taken substantially along the line 3—3 in FIG. 1.
Figure 5:
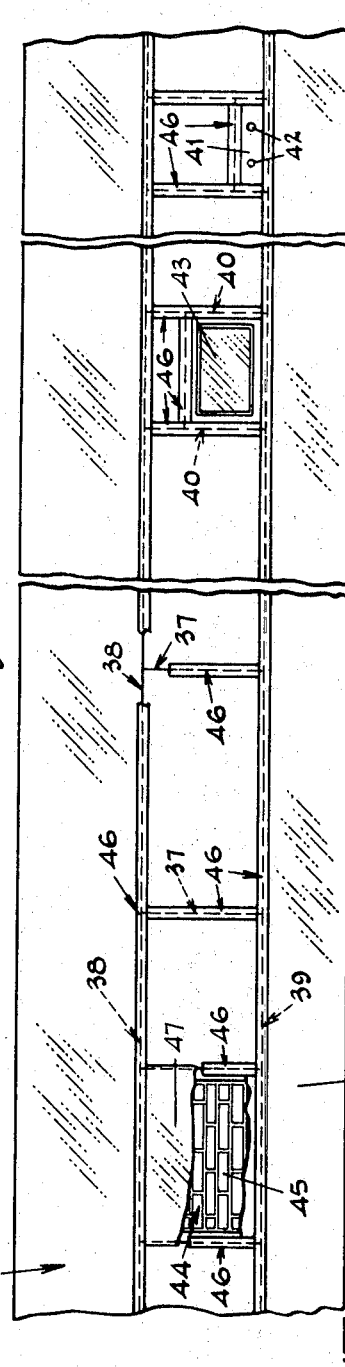
FIG. 5 is a fragmentary side view of the apparatus of FIG. 1, showing various applications of the membranes of the invention with portions of the membrane broken away.

Thus, as best shown in FIGS. 3 to 5 the invention is practiced to its fullest extent by covering all of the joints 37 between adjacent side wall blocks 36, the joints 38 between the side wall and roof, joints 39 between the side wall and the bath tank, and joints 40 between the side wall blocks and the viewing and operating equipment with strips 46 of metal foil shortly after the float apparatus is built and preferably after it has been heated up to working temperatures.

Similarly, whenever a side wall block or a piece of viewing or operating equipment is removed and replaced the joints around the replacing element can be effectively sealed by covering them in the same way.

On the other hand, however, the invention may be employed primarily, or even exclusively, to provide adequate seals for joints in trouble areas where leakage is encountered, and/or in repairing joints or cracks as well as in sealing openings anywhere in the plenum chamber, including the substantially integral roof portion, by following substantially the same procedure.

Also, when it is necessary to leave a temporary opening such as illustrated at 44, and which may or may not be bricked up during the interval, leakage through such opening can be effectively prevented by covering the same with a sheet 47 of the foil.

The metal foil may be held in place over the space between a joint or crack or that is presented by any opening or around the chamber 23 in any number of ways, or by any conventional means, including a suitable adhesive carried by the foil itself. In actual practice however, it has been found that commercial metal foils may be effectively applied to the side wall blocks, closure plates and so forth at either side of the spaces to be covered, at the temperatures they normally attain in an operating float glass apparatus, by simply pressing the foil against the heated surfaces. Also where slow setting or permanently plastic cement is used in the spaces, before covering them with foil, the cement acts to hold or to assist in holding the foil or membrane in place over the opening or joint.

One of the most satisfactory sealing adhesives for this purpose has been found to be sodium silicate, preferably applied to the surface of the foil just prior to pressing it in place over the joint, and sometimes employed as an outer coating to cover the attached foil and extend over onto adjacent surfaces. Also, in addition to mounting it flat, as shown in FIG. 3, the foil can be wrapped around the surfaces adjacent the joint to be sealed wherever this is expedient or desirable.

Thus, as indicated in FIG. 4, the refractory side wall block 36, tank 12 and the roof block 48 may be provided with metallic casings 49 having outwardly extending flanges 50, in which case the joints 38 and 39 are actually between the abutting surfaces of the metal casings and the metail foil 46 is wrapped in place around the extended portions of the flanges 50 as shown. A similar procedure is followed in cases where the mountings or closure members 41 embody an extending flange or similar construction that is not flush with the side wall 35.

However, it is to be understood that the forms of the invention herein shown and described are to be taken as illustrative embodiments only of the same, and that various changes in the shape, size and arrangement of parts, as well as various procedural and compositional changes may be resorted to without departing from the spirit of the invention as defined in the following claims.

I claim:

1. In a float glass forming apparatus including a tank containing a bath of molten metal upon which a ribbon of glass is floated and advanced, and a plenum chamber positioned above said tank and confining a float glass atmosphere over said bath and ribbon, said chamber including a roof portion and side walls having closure members at least partially surrounding operating and viewing equipment therein creating a space adjacent a component part of said chamber, said component part including a flange extending outwardly from said chamber adjacent said space, the improvement comprising a substantially gas impervious heat resisting membrane wrapped around said flange and covering said space.

2. Apparatus as defined in claim 1 in which said membrane is metal foil.

3. Apparatus as defined in claim 1 in which said membrane is a strip of aluminum foil.

4. Apparatus as defined in claim 1 which includes a coating of sodium silicate on said membrane and in adhesive contact with said chamber.

References Cited
UNITED STATES PATENTS

| | | | |
|---|---|---|---|
| 2,178,134 | 10/1939 | Blau | 65—27 |
| 3,298,814 | 1/1967 | Mambourg | 65—346 |
| 3,326,657 | 6/1967 | Brady | 65—193 X |
| 3,332,763 | 7/1967 | Basler | 65—99 X |
| 3,340,031 | 9/1967 | Zellers | 65—374 X |
| 3,337,320 | 8/1967 | Dyck | 65—99 |
| 3,351,450 | 11/1967 | Silverwood | 65—99 |
| 3,443,922 | 5/1969 | Settino | 65—182 |

S. LEON BASHORE, Primary Examiner

E. R. FREEDMAN, Assistant Examiner

U.S. Cl. X.R.

49—475; 52—469, 470; 65—27, 65, 99, 182